United States Patent [19]

Yang

[11] Patent Number: 5,189,482
[45] Date of Patent: Feb. 23, 1993

[54] OPTICAL APPARATUS FOR FINGERPRINT RECOGNITION SYSTEM

[75] Inventor: Keun Y. Yang, Seoul, Rep. of Korea

[73] Assignee: Goldstar Co., Ltd., Seoul, Rep. of Korea

[21] Appl. No.: 704,228

[22] Filed: May 22, 1991

[30] Foreign Application Priority Data

May 30, 1990 [KR] Rep. of Korea ............... 7896/1990

[51] Int. Cl.$^5$ .............................................. G06K 9/20
[52] U.S. Cl. .......................................... 356/73; 382/4
[58] Field of Search .............................. 356/71; 382/4

[56] References Cited

U.S. PATENT DOCUMENTS

| | | | |
|---|---|---|---|
| 4,728,186 | 3/1988 | Eguchi et al. | 356/71 |
| 4,924,085 | 5/1990 | Kato et al. | 356/71 X |

Primary Examiner—Vincent P. McGraw

[57] ABSTRACT

An optical apparatus for a fingerprint recognition system utilizes a light source for emitting a spherical beam. A collimating hologram produces a plane beam upon receiving the emitted spherical beam from the light source. A diffuser generates a scattered beam by scattering the plane beam. A prism absorbs the light at ridges of a subject fingerprint and reflects the light at valleys of the subject fingerprint. An image producing hologram then processes the reflected spherical beam from the prism corresponding to the valleys and condenses the spherical beam upon an area CCD. The area CCD converts the produced fingerprint image into an electric signal. The fingerprint image producing hologram and a cutoff/absorption plate for cutting off and absorbing the beam are, respectively, mounted on a vertical surface of the prism.

5 Claims, 3 Drawing Sheets

OPTICAL APPARATUS FOR FINGERPRINT RECOGNITION SYSTEM

BACKGROUND OF THE INVENTION

The present invention relates to an optical apparatus for a fingerprint recognition system, and more particularly, to an optical apparatus for a fingerprint recognition system which uses the characteristics of a beam emitted from a light source with respect to the absorption at ridges and reflection at valleys of fingerprint of individual finger laid on a surface of triangular prism.

As shown in FIGS. 1 and 2 which show an embodiment of a known optical apparatus for a fingerprint recognition system, the known optical apparatus comprises an LED (light emitting diode) array 20 as a light source for emitting light, a diffuser 3 for scattering the emitted beam from the LED array 20, a triangular prism 4 providing a slant surface for laying a subject finger, an image producing lens system 30 for producing a fingerprint image by receiving the reflected beam from the triangular prism 4, an area CCD (area charge coupled device) 6 for converting the produced fingerprint image into an electric signal, and an amplifying/analyzing circuit 19 for amplifying and then analyzing the electric signal converted at the area CCD 6 upon receiving it therefrom.

The operation of the above-mentioned known optical apparatus starts the fingerprint recognizing operation thereof as emitting a beam from the LED array 20 to the diffuser 3 wherein the beam is scattered, upon laying a subject finger on the slant surface of the triangular prism 4. In the prism 4, the scattered incident beam from the diffuser 3 is absorbed at ridges, contacting to the slant surface of the prism 4, but reflected at valleys, not contacting to the slant surface, of the fingerprint, then the reflected beam is reflected to the lens system 30 which processes the reflected beam which produces the subject fingerprint image upon the area CCD 6. The area CCD 6 converts the produced image into an electric signal and outputs the signal to the amplifying/analyzing circuit 19 wherein the signal is amplified and analyzed in order to recognize the subject fingerprint.

However, in the known optical apparatus, the object being processed, that is to say, the subject finger is laid as oriented at a non-normal angle to the path of the beam of the image producing lens system 30 so that the produced fingerprint image upon the area CCD 6 may be also oriented at a non-normal angle to the path of the beam, thereby causing the produced fingerprint image to be distinct near the path of the beam but gradually indistinct in proportion to the distance from the path of the beam. Such a phenomenon encountered in the orientation of the object at a non-normal angle to the path of the beam in the known apparatus may produce erroneous results in the fingerprint recognition. Other problems occur when the image producing lens system 30 comprises several lenses overlapping with one another in order to solve the above-described drawback. The optical apparatus having the image producing lens system comprising several lens has other problems that it introduces such as the expense and size thereof.

SUMMARY OF THE INVENTION

It is, therefore, the object of the present invention to provide an optical apparatus for fingerprint recognition system which uses holograms for collimating an emitted beam from a light source and producing subject fingerprint image. The holograms are capable of mass product, and the image producing hologram is mounted at a location of a vertical surface of the triangular prism in order to produce a distinct fingerprint image.

It is another object of the present invention to provide an optical apparatus for fingerprint recognition system using a laser as a light source from which an emitted beam is transmitted through the collimating hologram and the image producing hologram mounted at the vertical surface of the triangular prism, thus a distinct fingerprint image can be obtained, thereby providing reliable recognition results.

To accomplish the above-mentioned objects, the present invention provides an optical apparatus for fingerprint recognition system comprising: a light source for emitting a spherical beam, a collimating hologram for reproducing a plane beam upon receiving the emitted spherical beam from the light source, a diffuser for producing a scattered beam by scattering the plane beam from the collimating hologram, a prism for absorbing the scattered beam at ridges but reflecting the scattered beam at valleys of subject fingerprint upon receiving the scattered beam from the diffuser, and a fingerprint image producing hologram for processing a reflected spherical beam from the prism corresponding to the valleys and condensing the spherical beam representing the subject fingerprint upon an area CCD for producing the fingerprint image thereon. The area CCD converts the produced fingerprint image into an electric signal. The prism includes the fingerprint image producing hologram and a cutoff/absorption plate for cutting off and absorbing the beam, respectively, mounted at vertical surface thereof.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
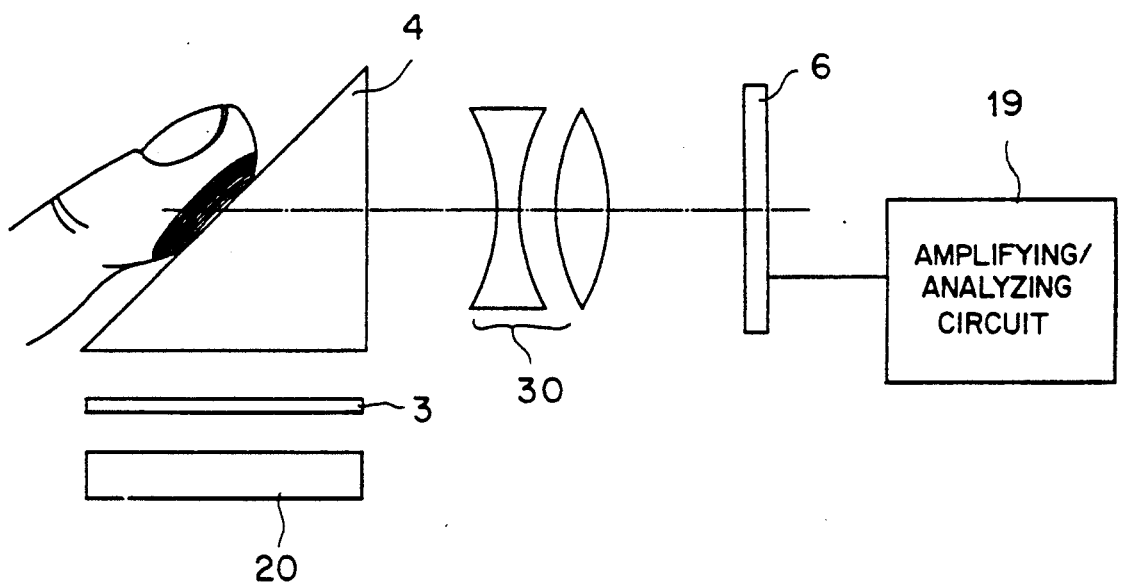
FIG. 1 is an optical schematic drawing of an embodiment of an optical apparatus for fingerprint recognition system according to the prior art.
Figure 2:
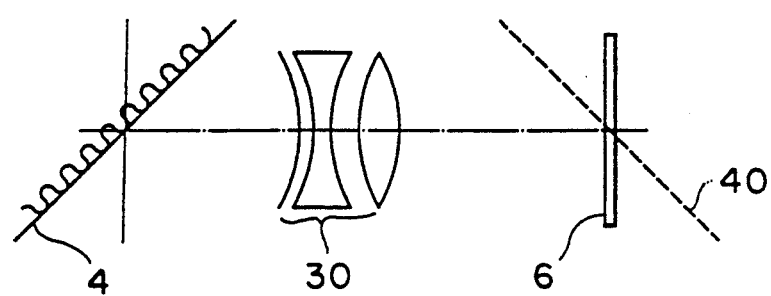
FIG. 2 is an optical schematic drawing showing a fingerprint image producing by the optical apparatus of FIG. 1.
Figure 3:
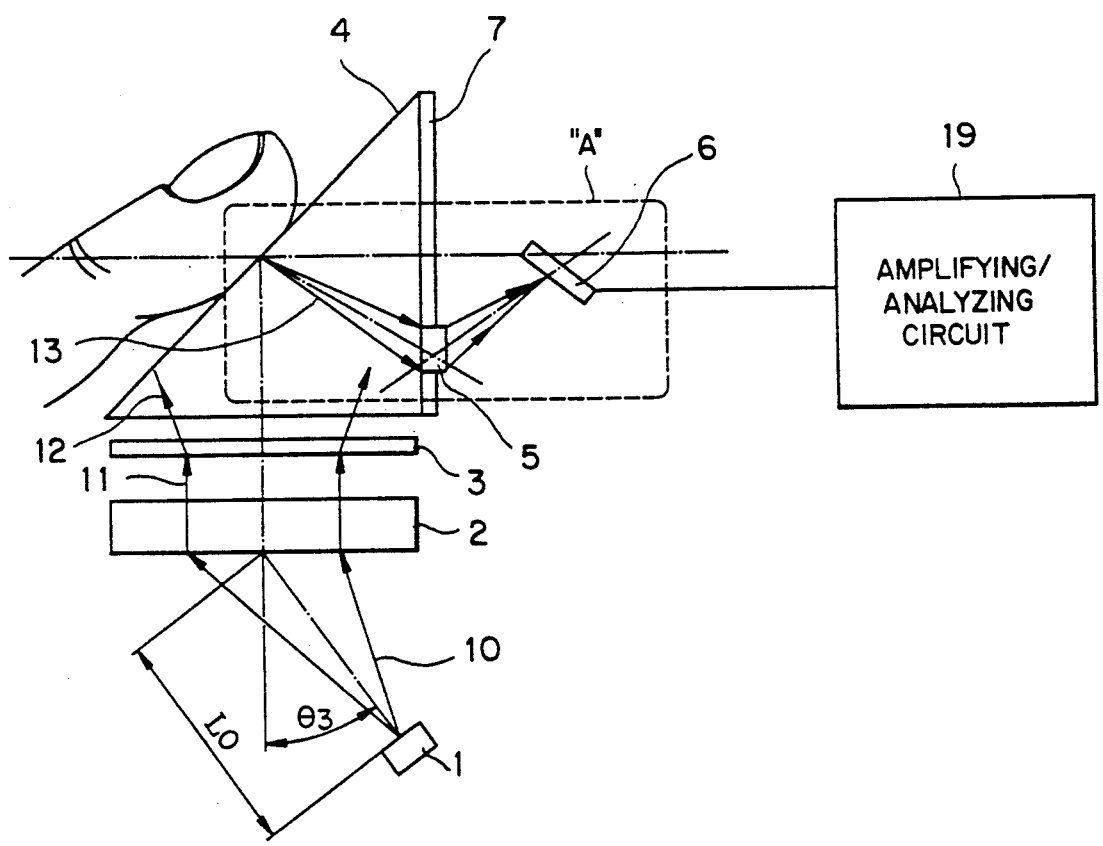
FIG. 3 illustrates an embodiment of the present invention.

Turning now to FIG. 3 which is an optical schematic drawing of an embodiment of an optical apparatus for fingerprint recognition system according to the present invention, the optical apparatus is provided with a laser 1 as a light source for emitting a spherical beam 10, a collimating hologram 2 for converting the spherical beam to a plane beam 11 upon receiving the emitted spherical beam 10 from the light source 1, a diffuser 3 for producing a scattered beam 12 by scattering the plane beam 11 from the collimating hologram 2, a triangular prism 4 for absorbing the scattered beam 12 corresponding to ridges of a fingerprint but reflecting the scattered beam corresponding to valleys of the fingerprint upon receiving the scattered beam 12 from the diffuser 3, a fingerprint image producing hologram 5 for receiving the reflected scattered beam and producing a reflected spherical beam 13 from the prism 4 corresponding to valleys of the fingerprint and producing the fingerprint image, and an area CCD 6 for converting the produced fingerprint image into an electric signal. The fingerprint image producing hologram 5 is directly mounted at a location on a vertical surface of the triangular prism 4. Also, a cutoff/absorption plate adapted for cutting off and absorbing the beam is provided at the triangular prism 4 as directly mounted at the vertical surface except where the image producing hologram 5 is mounted. There is provided, after the area CCD 6, a known amplifying/analyzing circuit 19 for amplifying and analyzing the electric signal from the area CCD 6 in order to recognize the subject fingerprint.

Figure 5:
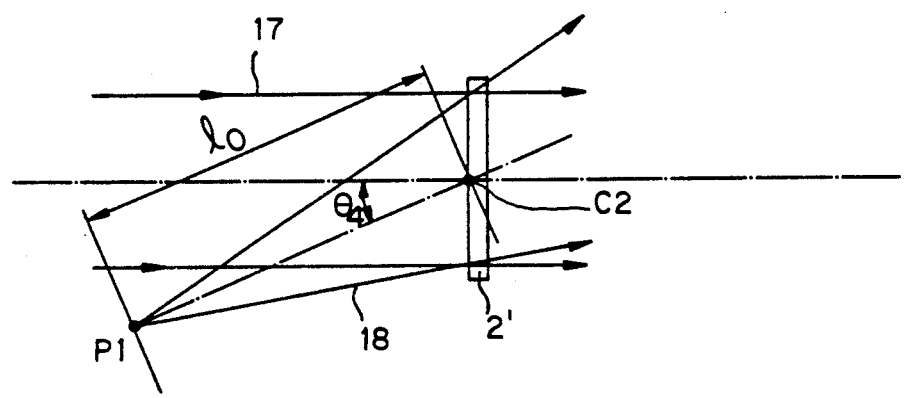
FIG. 5 is an optical schematic drawing showing the function of a collimating hologram of the optical apparatus of FIG. 3.

In addition, the laser 1 is so mounted as to be located at an angle of $\theta 3$ in a distance of Lo from the center point of the collimating hologram 2, as shown in FIG. 3. The manufacture and functions of the collimating hologram 2 will be described in conjunction with FIG. 5 as follows. That is to say, the collimating hologram 2 is installed with respect to the laser 1 as locating hologram 2' to, collimate the beam. At a center point C2 of the hologram 2', a spherical beam 18, as a reference beam emitted from a spherical beam scanning point P1 and a distance of lo from the center point C2, crosses with a plane beam 17, an object beam, at an angle of $\theta 4$, wherein $\theta 4 = \theta 3$, and Lo=lo. In accordance, when the laser 1 is located at the beam scanning point P1 with respect to the collimating hologram 2 as described above and emits the spherical beam to the collimating hologram 2, the collimating hologram 2 will reproduce a plane beam, an object beam, upon receiving the spherical beam.

The diffuser 3 is located and spaced apart between the collimating hologram 2 and the triangular prism 4 so that it scatters the plane beam 11 from the collimating hologram 2 in order to make the scattered beam 12.

Figure 4:
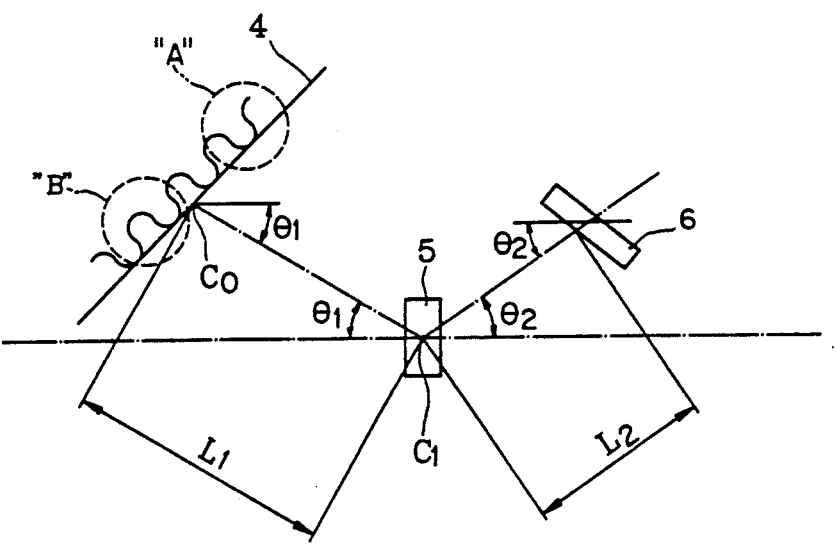
FIG. 4 illustrates another embodiment of the present invention.

On the other hand, the fingerprint image producing hologram 5 is, as shown in FIG. 4, mounted at the vertical surface of the prism 4 with an angle $\theta 1$ and a distance of L1 from a center point Co of the slant surface of the prism 4. The area CCD 6 is, additionally, located at a location with an angle of $\theta 2$ and a distance of L2 from a center point C1 of the image producing hologram 5. At this time, the following conditions must be satisfied:

$$\theta 1 = \theta 2, 25° < \theta 1, \theta 2 < 35°,$$

and $$L1 \cos \theta 1 = 2n\ L2 \cos \theta 2\ (n:\ \text{the refractive index of the triangular prism}).$$

Figure 6:
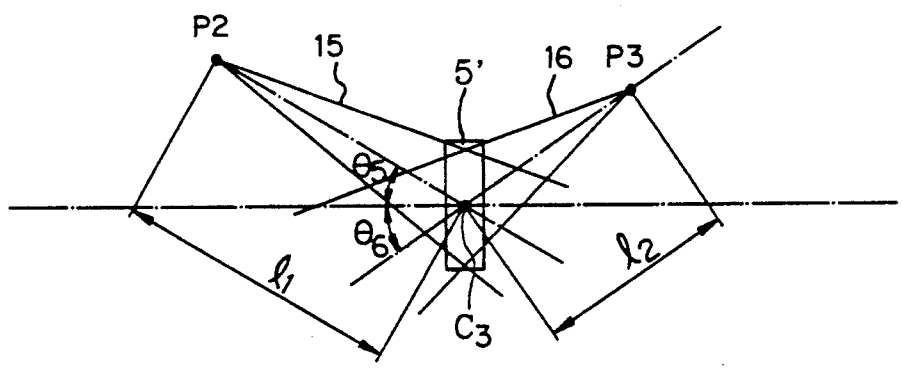
FIG. 6 is an optical schematic drawing showing the function of a fingerprint image producing hologram of the optical apparatus of FIG. 3.
Figure 7:
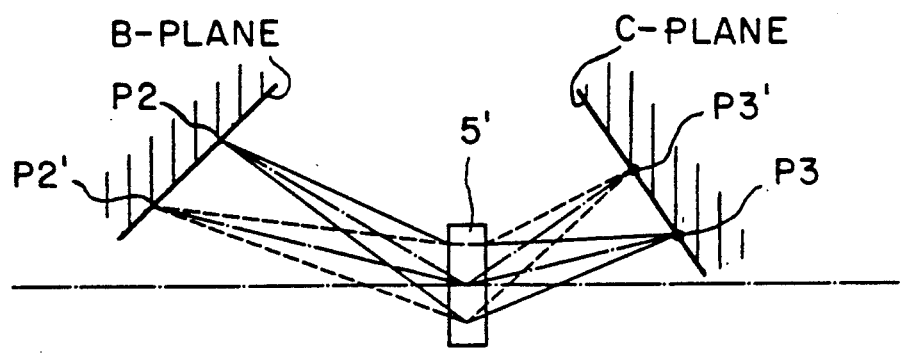
FIG. 7 is an optical schematic drawing showing an image produced by a fingerprint image producing hologram of the optical apparatus of FIG. 3.

Additionally, the fingerprint image producing hologram 5 is, as shown in FIG. 6, made as locating hologram 5' to image produce the fingerprint. At a center point C3 of the hologram 5' a spherical beam 15, a reference beam, emitted from a spherical beam scanning point P2 and a distance of l1 from the center point C3 crosses at an angle of $\theta 5 + \theta 6$ with a condensed spherical beam 17 condensed at a beam condensing point P3 and a distance of l2 from the center point C3. In accordance, when the laser 1 is located at the beam scanning point P1 with respect to the collimating hologram 2, as described above, and emits the spherical beam to the collimating hologram 2, the collimating hologram 2 will produce a the plane beam, an object beam, upon hologram 2 in order to make a scattered beam 12.

On the other hand, the fingerprint image producing hologram 5 is, as shown in FIG. 4, mounted on the vertical surface of the prism 4 with an angle $\theta 1$ and a distance of L1 from a center point Co of the slant surface of the prism 4. The area CCD 6 is, additionally, located at a location with an angle of $\theta 2$ and a distance of L2 from a center point C1 of the image producing hologram 5. At this time, the following conditions must be satisfied:

$$\theta 1 = \theta 2, 25° < \theta 1, \theta 2 < 35°,$$

and $$L1 \cos \theta 1 = 2n\ L2 \cos \theta 2\ (n:\ \text{the refractive index of the triangular prism}).$$

Additionally, the fingerprint image producing hologram 5 is, as shown in FIG. 6, made as locating hologram 5' to image produce the fingerprint. At a center point C3 of the hologram 5' a spherical beam 15, a reference beam, emitted from a spherical beam scanning point P2 and a distance of l1 from the center point C3 crosses at an angle of $\theta 5 + \theta$ with a condensed spherical beam 17 condensed at a beam condensing point P3 and a distance of l2 from the center point C3. In accordance, when the laser 1 is located at the beam scanning point P1 with respect to the collimating hologram 2, as described above, and emits the spherical beam to the collimating hologram 2, the collimating hologram 2 will reproduce a plane beam, an object beam, upon receiving the spherical beam. At this time, the following conditions must be satisfied:

$$\theta 1 = \theta 5, \theta 2 = \theta 6, L1 = nl1, L2 = l2,$$

and $$25° < \theta 5\ \text{and}\ \theta 6 < 35°.$$

In accordance, when a spherical beam is emitted from the beam scanning point P2 on a B-plane to the hologram 5', the hologram 5' processes the emitted spherical beam and condenses a spherical beam at the beam condensing point P3 of a C-plane. In the same manner, when a spherical beam is emitted from other beam scanning point P2' on the B-plane to the hologram 5', the hologram 5' processes the emitted spherical beam and condenses a spherical beam at other beam condensing point P3' of the C-plane.

The operation of the above-mentioned optical apparatus for fingerprint recognition system according to this invention will be described in detail.

The optical apparatus starts the fingerprint recognizing operation thereof by emitting the spherical beam 10 from the laser 1 to the collimating hologram 2 after laying a subject finger on the slant surface of the triangular prism 4. In the collimating hologram 2, the spherical beam 10 from the laser 1 is then processed in order to reproduce a plane beam 11. Thereafter, the plane beam 11 is scattered by the diffuser 3. The triangular prism 4 then receives the incident scattered beam 12 from the diffuser 3. The scattered beam 12 is absorbed at ridges of the fingerprint (for example, A portion in FIG. 4), contacting to the slant surface of the prism 4, and reflected as a spherical beam 13 at valleys of the fingerprint (for example, B portion in FIG. 4), not contacting to the slant surface. The reflected spherical beam 13 is received by the image producing hologram 5 wherein the spherical beam 13 is then condense to a condensed spherical beam and transmitted to the area CCD 6, thereby causing a subject fingerprint image to be produced on the area CCD 6. The fingerprint image produced on the area CCD 6 is then converted into an electric signal corresponding to the image at the area CCD 6, thereafter the electric signal is outputted to the amplifying/analyzing circuit 19 in order to be amplified, then analyzed. As a result, the fingerprint recognition is accomplished.

As above-mentioned, the present invention can provide an optical apparatus for fingerprint recognition system which is compact in size, by directly mounting an image producing hologram, capable of mass production, at a triangular prism, and condense the spherical beam representing the ridges and valleys of the subject fingerprint at the area CCD so that the fingerprint image can be produced distinctly irrespective of the distance from the path of the beam. As a result, the present invention can provide an optical apparatus for fingerprint recognition system having good reliability, and furthermore, an additional advantage of lowering manufacturing cost by using holograms capable of mass production.

Although the preferred embodiment of the invention have been disclosed for illustrative purpose, those skilled in the art will appreciate that various modifications, additions and substitutions are possible, without departing from the scope and spirit of the invention as disclosed in the accompanying claims.

What is claimed is:

1. An optical apparatus for fingerprint recognition system comprising:

a light source for emitting a spherical beam;

collimating hologram means for producing a plane beam upon receiving the emitted spherical beam from said light source;

diffuser means for scattering the plane beam from said collimating hologram onto a subject fingerprint;

prism means for absorbing the scattered beam encountering ridges in the subject fingerprint ridges and reflecting the scattered beam encountering valleys in the subject fingerprint;

fingerprint image producing hologram means for converting the scattered beam encountering the valleys reflected by said prism into a reflected spherical beam and for condensing the reflected spherical beam representing the subject fingerprint; and a light sensitive area for converting the condensed reflected spherical beam of the fingerprint image into an electric signal;

said prism means including a cutoff/absorption plate for cutting off and absorbing the scattered beam;

said fingerprint producing hologram means being mounted on a surface of said prism means vertical to a surface receiving the plane beam.

2. The optical apparatus according to claim 1, wherein said collimating hologram means is mounted at an angle of $\theta_3$ and a distance of $L_o$ from said light source and at a center point $C_2$ of said collimating hologram means, a spherical beam, as a reference beam emitted from a spherical beam scanning point $P_1$ located at a distance of $l_o$ from said center point $C_2$, crosses with a plane beam, as an object beam, at an angle of $\theta_4$ and wherein $\theta_4 = \theta_3$ and $L_o = l_o$.

3. The optical apparatus according to claim 1, wherein said fingerprint image producing hologram means is counted at a location on said prism means having an angle $\theta_1$ with respect to and a distance of $L_1$ from a center point $C_o$ of a slant surface of said prism means;

said light sensitive area being located at a location having an angle of $\theta_2$ with respect to and a distance of $L_2$ from a center point $C_1$ of said fingerprint image producing hologram means; and $\theta_1 = \theta_2$, $25° < \theta_1$, $\theta_2 < 35°$, and $L_1 \cos\theta = 2n L_2 \cos\theta_2$, being a refractive index of said prism means.

4. The optical apparatus according to claim 3, wherein said fingerprint image producing hologram means is a hologram;

at a center point $C_3$ of said fingerprint image producing hologram means, a spherical beam, as a reference beam emitted from a spherical beam scanning point $P_2$ and a distance of $l_1$ from the center point $C_3$, crosses at an angle of $\theta_5 + \theta_6$ with a condensed spherical beam condensed at a point $P_3$ and a distance of $l_2$ from the center point $C_3$; and $\theta_1 = \theta_5$, $\theta_2 = \theta_6$, $L_1 = nl_1$, $L_2 = l_2$, $25° < \theta_5$, and $\theta_6 < 35°$.

5. The optical apparatus according to claim 1, wherein said light source is a laser.

* * * * *